(12) United States Patent
Forbes et al.

(10) Patent No.: US 11,293,529 B2
(45) Date of Patent: Apr. 5, 2022

(54) SNOWBLOWER BELT DRIVE SYSTEM

(71) Applicant: DEERE & COMPANY, Moline, IL (US)

(72) Inventors: Eric M. Forbes, Oconomowoc, WI (US); Rodney A. Fritz, Oconomowoc, WI (US)

(73) Assignee: DEERE & COMPANY, Moline, IL (US)

(*) Notice: Subject to any disclaimer, the term of this patent is extended or adjusted under 35 U.S.C. 154(b) by 357 days.

(21) Appl. No.: 16/416,353

(22) Filed: May 20, 2019

(65) Prior Publication Data
US 2020/0370626 A1 Nov. 26, 2020

(51) Int. Cl.
*F16H 7/12* (2006.01)
*E01H 5/08* (2006.01)
*F16H 7/08* (2006.01)

(52) U.S. Cl.
CPC ............ *F16H 7/1263* (2013.01); *E01H 5/08* (2013.01); *F16H 2007/0808* (2013.01); *F16H 2007/0842* (2013.01); *F16H 2007/0891* (2013.01)

(58) Field of Classification Search
CPC ............... F16H 7/08; F16H 2007/0808; F16H 2007/0842; F16H 2007/0865; F16H 2007/0876; F16H 2007/088; F16H 2007/0891; F16H 7/1263; F16H 7/1254; F16H 7/12; F16H 7/0827; F16H 2007/0806; E01H 5/00; E01H 5/04; E01H 5/045; E01H 5/073; E01H 5/076

USPC ........ 474/133, 135, 136, 138; 56/11.3, 11.6, 56/11.8
See application file for complete search history.

(56) References Cited

U.S. PATENT DOCUMENTS

| | | | |
|---|---|---|---|
| 2,806,382 A | 9/1957 | Gehrke | |
| 3,274,841 A | 9/1966 | Roberts | |
| 3,691,860 A | 9/1972 | Danuser | |
| 4,104,812 A * | 8/1978 | Stribiak, Jr. | E01H 5/04 37/243 |
| 4,123,857 A * | 11/1978 | Enters | E01H 5/04 37/252 |
| 4,253,343 A * | 3/1981 | Black | A01F 29/14 198/813 |
| 4,255,879 A * | 3/1981 | Greider | B60K 28/04 172/42 |
| 4,294,027 A * | 10/1981 | Edwards | E01H 5/04 37/259 |
| 4,457,086 A * | 7/1984 | Bacon | E01H 5/04 192/3.54 |
| 4,549,365 A * | 10/1985 | Johnson | E01H 5/098 192/13 R |
| 4,721,494 A * | 1/1988 | Hayashi | A01D 34/6806 192/13 A |
| 4,813,215 A * | 3/1989 | Chase | A01D 34/76 56/11.3 |
| 5,012,632 A | 5/1991 | Kuhn et al. | |

(Continued)

*Primary Examiner* — Michael R Mansen
*Assistant Examiner* — Raveen J Dias

(57) ABSTRACT

A snowblower belt drive system a tensioner pulley that can slide forwardly and rearwardly in a path that is substantially parallel to an endless drive belt between a drive pulley and a driven pulley. A drive belt engagement spring urges the tensioner pulley rearwardly along the slot to engage the drive pulley and driven pulley. A manual return spring urges the tensioner pulley forwardly along the slot to disengage the drive pulley and driven pulley.

8 Claims, 4 Drawing Sheets

(56) References Cited

U.S. PATENT DOCUMENTS

| | | | |
|---|---|---|---|
| 5,669,841 A | 9/1997 | Schick | |
| 5,797,251 A * | 8/1998 | Busboom | A01D 34/6812 56/11.3 |
| 5,832,703 A * | 11/1998 | Evans | A01D 34/6806 56/11.4 |
| 6,035,561 A * | 3/2000 | Paytas | E01H 5/045 180/68.5 |
| 6,170,179 B1 * | 1/2001 | Paytas | E01H 5/045 180/68.5 |
| 6,282,873 B1 | 9/2001 | Wilken | |
| 7,730,642 B2 | 6/2010 | Sugiura | |
| 8,057,335 B1 * | 11/2011 | Langenfeld | B60T 1/062 474/139 |
| 9,730,383 B2 | 8/2017 | Greulich et al. | |
| 2001/0001922 A1 * | 5/2001 | Abend | F16H 39/14 60/435 |
| 2001/0042363 A1 * | 11/2001 | Walters | A01D 34/76 56/11.2 |
| 2001/0046915 A1 * | 11/2001 | Green | F16H 7/1254 474/138 |
| 2002/0039943 A1 * | 4/2002 | Serkh | F16H 7/1218 474/134 |
| 2002/0039946 A1 * | 4/2002 | Serkh | F16H 7/1218 474/136 |
| 2002/0170209 A1 * | 11/2002 | Ruebusch | E01H 5/04 37/252 |
| 2002/0189137 A1 * | 12/2002 | Cox | E01H 5/04 37/242 |
| 2003/0176250 A1 * | 9/2003 | Austin | F16H 7/1281 474/134 |
| 2004/0087401 A1 * | 5/2004 | Serkh | F16H 7/1218 474/134 |
| 2004/0118097 A1 * | 6/2004 | Gandrud | A01D 34/6806 56/11.3 |
| 2006/0089219 A1 * | 4/2006 | Maertens | A01D 69/00 474/87 |
| 2006/0217223 A1 * | 9/2006 | Schmid | F16H 7/1263 474/136 |
| 2008/0132365 A1 * | 6/2008 | Boussaguet | F16H 7/20 474/136 |
| 2008/0302075 A1 * | 12/2008 | Eavenson, Sr. | A01D 34/76 56/11.6 |
| 2009/0183395 A1 * | 7/2009 | Sugiura | E01H 5/04 37/259 |
| 2011/0083412 A1 * | 4/2011 | Jackson | A01D 69/10 56/11.3 |
| 2011/0283672 A1 * | 11/2011 | Jackson | A01D 69/08 56/11.3 |
| 2016/0007526 A1 * | 1/2016 | Greulich | F16H 7/08 56/10.2 R |
| 2017/0211664 A1 * | 7/2017 | Shoji | B60K 17/02 |
| 2018/0274189 A1 * | 9/2018 | Champagne | F16H 7/14 |
| 2020/0080622 A1 * | 3/2020 | Foster | A01D 34/82 |
| 2020/0088270 A1 * | 3/2020 | Spitz | B60K 23/00 |
| 2020/0346689 A1 * | 11/2020 | Moore | F16H 7/00 |
| 2020/0370627 A1 * | 11/2020 | Caprotti | F16H 7/1263 |

* cited by examiner

SNOWBLOWER BELT DRIVE SYSTEM

FIELD OF THE INVENTION

This invention relates to tractor-mounted snowblowers, and specifically to a snowblower belt drive system.

BACKGROUND OF THE INVENTION

Snowblowers are designed to lift snow off the ground surface and blow the snow away from the area being cleared. Single stage snowblowers may include a scraper to lift or scrape snow from the surface, and an impeller that moves the snow up and out through a discharge chute. Two stage snowblowers include a metal auger that rotates on a horizontal axis to break up and draw snow into the housing where the impeller then forces it up and out the discharge chute.

Snowblowers may be installed onto the front of lawn tractors or utility vehicles using a hitch and a belt drive system. The belt drive system may deliver power from the drive pulley on the lawn tractor to a driven pulley on the snowblower, which may be connected through a gearbox to the auger and/or impeller. The belt drive system may include a tensioning pulley on the end of a tension arm. A spring pulls on the tension arm, at an angle to the direction of belt travel between the drive pulley and driven pulley, to create a moment arm that creates tension in the belt.

A snowblower belt drive system is needed that takes up less space and is less costly. A snowblower belt drive system is needed that compensates for changes in belt length, and may be used on a variety of different lawn tractors and snowblowers having different belt lengths, sheave sizes, and operating speeds. A snowblower belt drive system is needed for snowblowers that may be operated using manual/mechanical controls or an electronic actuator or PTO switch.

SUMMARY OF THE INVENTION

A snowblower belt drive system includes a tensioner pulley that is slideable forwardly and rearwardly along a slot while in engagement with a drive belt on a snowblower. A pivoting tensioning arm is connected by a linkage to the tensioner pulley. A drive belt engagement spring urges the tensioning arm to pivot in a direction to slide the tensioner pulley rearwardly. The snowblower belt drive system takes up less space and is less costly. The snowblower belt drive system also compensates for changes in belt length, and may be used on a variety of different lawn tractors and snowblowers having different belt lengths, sheave sizes, and operating speeds. The snowblower belt drive system may be operated using manual/mechanical controls or an electronic actuator or PTO switch.

DESCRIPTION OF THE PREFERRED EMBODIMENT

Figure 1:
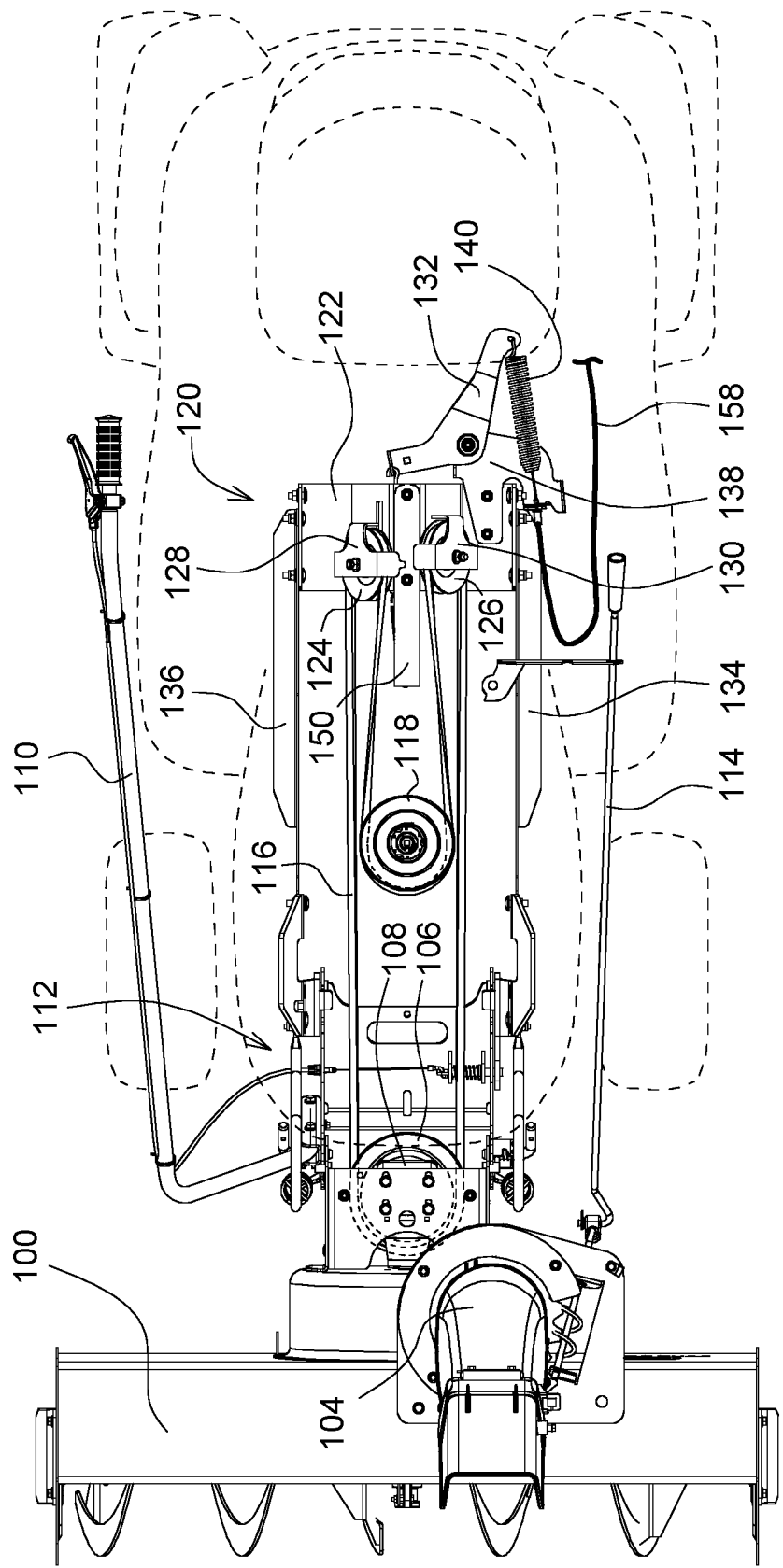
FIG. 1 is a top view of a lawn tractor with a snowblower belt drive system according to a preferred embodiment of the invention.

In a preferred embodiment shown in FIG. 1, snowblower belt drive system 120 may be used with snowblower 100 mounted to the front of a lawn tractor or utility vehicle using snowblower hitch assembly 112. Snowblower belt drive system 120 may include endless drive belt 116, drive pulley 118 on the lawn tractor or utility vehicle, and driven pulley 106 on the snowblower. Driven pulley 106 may be connected through snowblower drive gearbox 108 to the horizontal shaft of an impeller. The impeller driveshaft may be connected to a worm gearbox that delivers power to an auger driveshaft. After the auger breaks up and draws snow into the housing, an impeller forces the snow up and out discharge chute 104. The operator may raise and lower the snowblower using lift lever 110, and may pivot the chute using turning control handle 114.

In a preferred embodiment, snowblower belt drive system 120 may include tensioner pulley 124 that can slide forwardly and rearwardly to operate the snowblower. For example, the tensioner pulley may slide forwardly and rearwardly along a path defined by slot 154. Tensioner pulley 124 may be rotatably mounted in tensioner pulley belt guide 128. Tensioner pulley belt guide 128 may be attached to tensioner slider 148 which may be slideably mounted in slot 154. Slot 154 may provide a linear path for the tensioner pulley that is parallel or substantially parallel to the path of belt 116 between drive pulley 118 and driven pulley 106. Slot 154 may be located in belt drive frame 122. Belt drive frame 122 may be mounted directly to the frame of the lawn tractor, or indirectly using left and right frame mounting members 134, 136.

Figure 2:
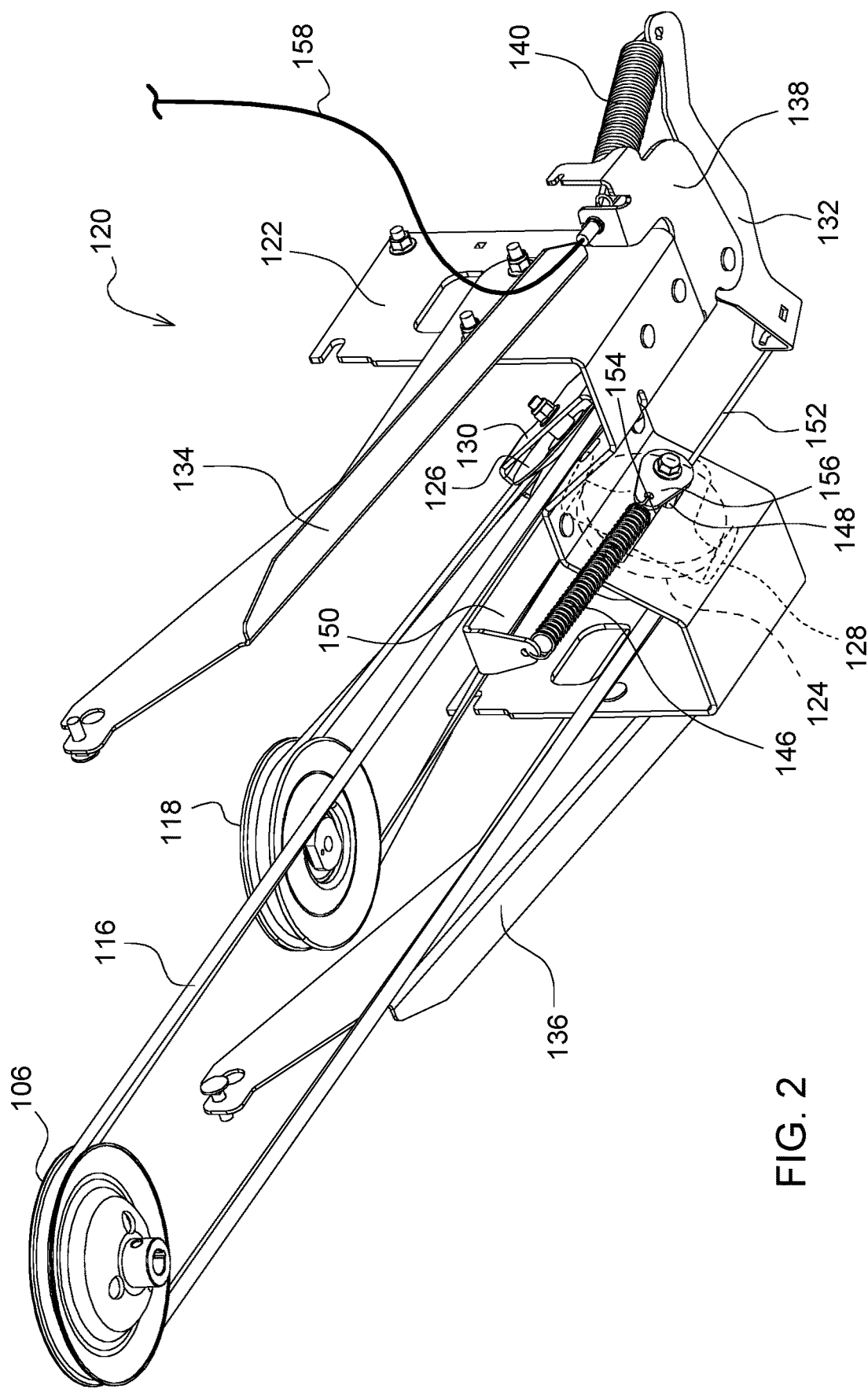
FIG. 2 is a bottom perspective view of a snowblower belt drive system that is engaged with a manual lever or actuator according to a preferred embodiment of the invention.

As shown in FIG. 2, in a preferred embodiment, snowblower belt drive system 120 may include cable 158, drive belt engagement spring 140, and tensioning arm 132. Cable 158 may be attached to a lever or other mechanical actuator in the operator station. Drive belt engagement spring 140 may be connected between cable 158 and tensioning arm 132. Tensioning arm 132 may be pivotably mounted to tensioning arm mounting bracket 138, attached to belt drive frame 122.

In a preferred embodiment, snowblower belt drive system may include linkage 152 and manual return spring 146. Linkage 152 may connect tensioning arm 132 to tensioner slider 148, and may be a wireform or other connector. Manual return spring 146 may connect between linkage bracket 156 and spring mount bracket 150.

In a preferred embodiment, the operator may engage snowblower belt drive system 120 by manually actuating a lever or other mechanical control to pull or increase tension of cable 158 and drive belt engagement spring 140. Cable 158 and drive belt engagement spring 140 may urge tensioning arm 124 to pivot relative to tensioning arm mounting bracket 138. Linkage 152 may pull tensioner slider 148 and tensioner pulley 124 rearwardly along slot 154 to increase belt tension and engage belt 116 with drive pulley 118 and driven pulley 106, as shown in FIG. 2. Belt 116 also may engage idler pulley 126 which is rotatably mounted in belt guide 130.

Figure 3:
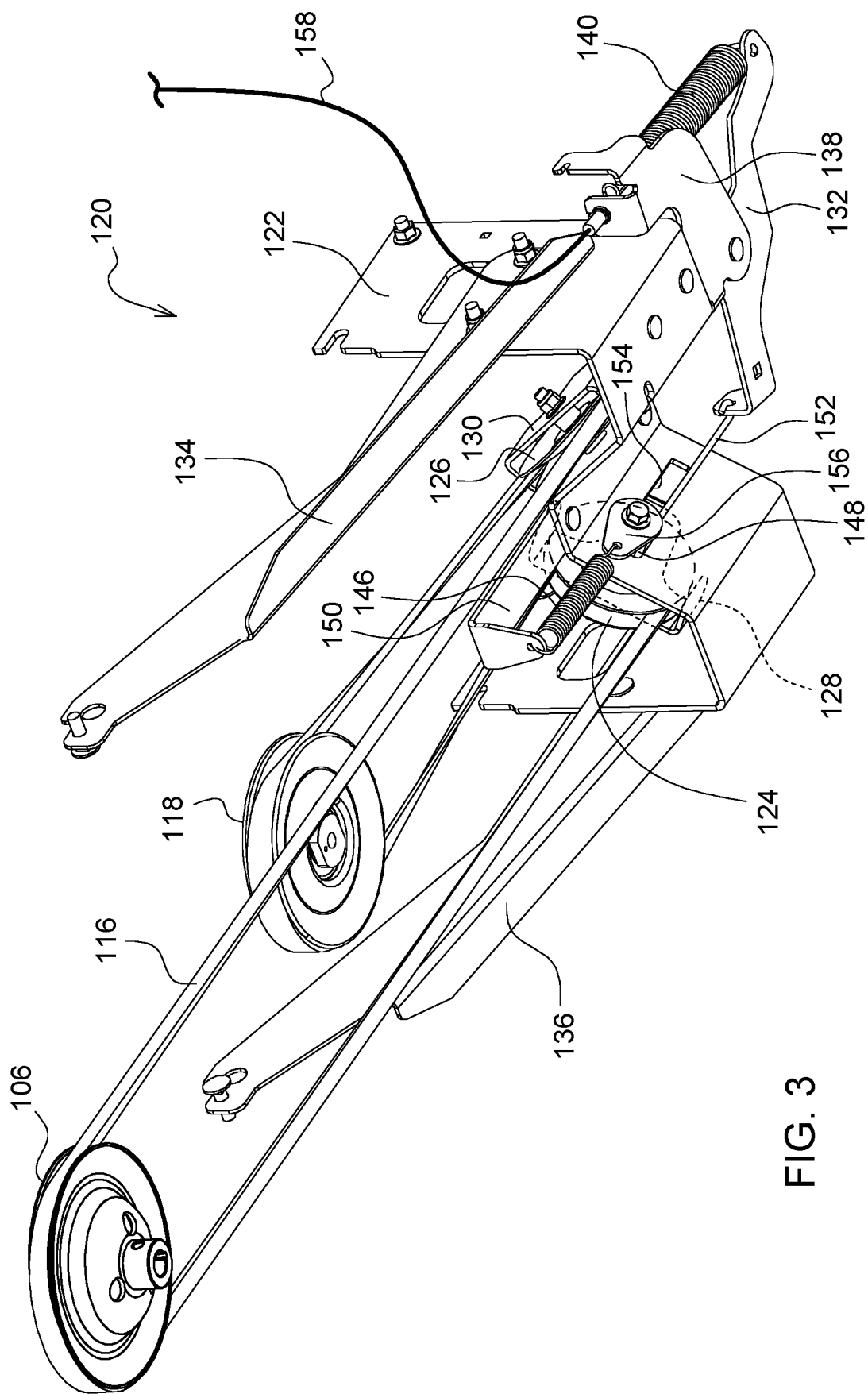
FIG. 3 is a bottom perspective view of a snowblower belt drive system that is disengaged with a manual lever or actuator according to a preferred embodiment of the invention.

In a preferred embodiment, the operator may disengage snowblower belt drive system 120 by manually actuating a lever or other mechanical control to release or reduce tension of cable 158 and drive belt engagement spring 140. As a result, tensioning arm 124 may pivot in the opposite direction. Manual return spring 146 may urge tensioner slider 148 and tensioner pulley 124 forwardly and linearly along slot 154 to decrease belt tension and disengage belt 116 from drive pulley 118 and driven pulley 106, as shown in FIG. 3.

Figure 4:
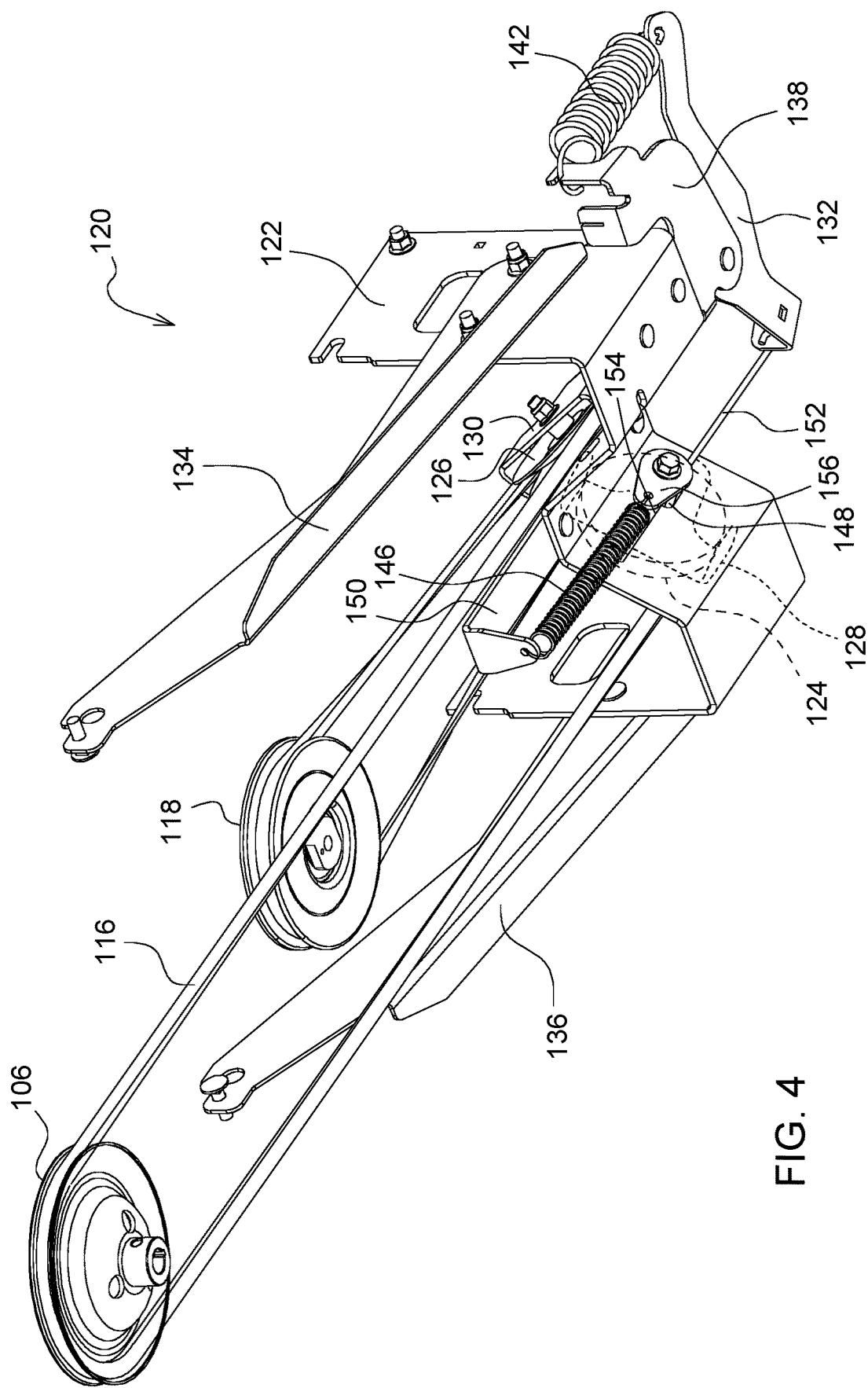
FIG. 4 is a bottom perspective view of a snowblower belt drive system that is engaged with an electronic actuator or PTO switch according to a preferred embodiment of the invention.

In the second preferred embodiment of FIG. 4, snowblower belt drive system 120 also may include tensioner pulley 124 that is biased rearwardly if the snowblower is operating or is not operating. For example, tensioner pulley may be biased rearwardly along a path defined by slot 154. Tensioner pulley 124 may be rotatably mounted in tensioner pulley belt guide 128. Tensioner pulley belt guide 128 may be attached to tensioner slider 148 which may be slideably mounted in slot 154. Slot 154 may provide a linear path for the tensioner pulley that is parallel or substantially parallel to the path of belt 116 between drive pulley 118 and driven pulley 106. Slot 154 may be located in belt drive frame 122. Belt drive frame 122 may be mounted directly to the frame of the lawn tractor, or indirectly using left and right frame mounting members 134, 136.

As shown in FIG. 4, in a second preferred embodiment, snowblower belt drive system 120 may include drive belt engagement spring 142 and tensioning arm 132. Drive belt engagement spring 142 may be connected between tensioning arm mounting bracket 138 and tensioning arm 132. Tensioning arm 132 may be pivotably mounted to tensioning arm mounting bracket 138, attached to belt drive frame 122.

In the second preferred embodiment, snowblower belt drive system also may include linkage 152 and manual return spring 146. Linkage 152 may connect tensioning arm 132 to tensioner slider 148, and may be a wireform or other connector. Manual return spring 146 may connect between linkage bracket 156 and spring mount bracket 150.

In a second preferred embodiment, as shown in FIG. 4, the snowblower belt drive system 120 may be used with electronic actuating controls such as an electronic PTO switch, instead of a manual lever mechanical actuator. For example, an electronic switch may start rotation of drive pulley 118. Drive belt engagement spring 142 may urge tensioning arm 124 to pivot relative to tensioning arm mounting bracket 138. Linkage 152 may pull tensioner slider 148 and tensioner pulley 124 rearwardly along slot 154 to provide belt tension and keep belt 116 in engagement with drive pulley 118 and driven pulley 106.

In a second preferred embodiment, as shown in FIG. 4, the snowblower belt drive system 120 may be turned off with electronic actuating controls such as an electronic PTO switch to stop rotation of drive pulley 118. Drive belt engagement spring 142 may continue to urge tensioning arm 124 to pivot, and linkage 152 may continue to pull tensioner slider 148 and tensioner pulley 124 rearwardly along slot 154. As a result, tensioner pulley 124 may continue to provide belt tension and keep belt 116 in engagement with drive pulley 118 and driven pulley 106 when the snowblower is not operating.

Snowblower belt drive system 120 may be used with snowblowers having various different belt lengths, sheave sizes, or operating speeds. The tensioner pulley 124 can slide forwardly and rearwardly along slot 154, and the linear path is parallel or substantially parallel to the path of belt 116 between drive pulley 118 and driven pulley 106.

Having described the preferred embodiment, it will become apparent that various modifications can be made without departing from the scope of the invention as defined in the accompanying claims.

The invention claimed is:

1. A snowblower belt drive system, comprising:
   a tensioner pulley that can slide forwardly and rearwardly in a slot that is substantially parallel to an endless drive belt between a drive pulley and a driven pulley;
   a drive belt engagement spring urging the tensioner pulley rearwardly along the slot to engage the endless drive belt with the drive pulley and driven pulley; and
   a manual return spring urging the tensioner pulley forwardly along the slot to disengage the endless drive belt from the drive pulley and driven pulley.

2. The snowblower belt drive system of claim 1 further comprising a pivoting tension arm connected to the drive belt engagement spring and the manual return spring.

3. The snowblower belt drive system of claim 1 wherein the tensioner pulley can slide forwardly and rearwardly in a path defined by the slot.

4. A snowblower belt drive system, comprising:
   a drive belt connecting a drive pulley on a lawn tractor and a driven pulley on a snowblower;
   a tensioner pulley slideable forwardly and rearwardly along a slot while in engagement with the drive belt;
   a pivoting tensioning arm connected by a linkage to the tensioner pulley; and
   a drive belt engagement spring urging the pivoting tensioning arm to pivot in a direction to slide the tensioner pulley;
   wherein the tensioner pulley slides forwardly and rearwardly parallel to the drive belt between the drive pulley and the driven pulley.

5. The snowblower belt drive system of claim 4 further comprising a manual return spring urging the pivoting tensioning arm to pivot in a direction to slide the tensioner pulley forwardly along the slot to disengage the drive belt from the driven pulley.

6. The snowblower belt drive system of claim 4 further comprising a cable connected to the drive belt engagement spring.

7. A snowblower belt drive system, comprising:
   a tensioner pulley that is biased in a first direction to engage a drive belt with a drive pulley and a driven pulley; and
   a tensioner slider that is slideably mounted in a slot which defines a linear path for the tensioner pulley that is parallel to the drive belt between the drive pulley and the driven pulley;
   wherein the tensioner pulley is biased in a second direction to disengage the drive belt from the drive pulley and the driven pulley.

8. The snowblower belt drive system of claim 7 wherein the tensioner pulley is rotatably mounted in a tensioner pulley belt guide.

* * * * *